June 29, 1937.  J. D. FERRY  2,085,494
IMPELLER MECHANISM FOR COOKING APPARATUS
Filed Dec. 4, 1936
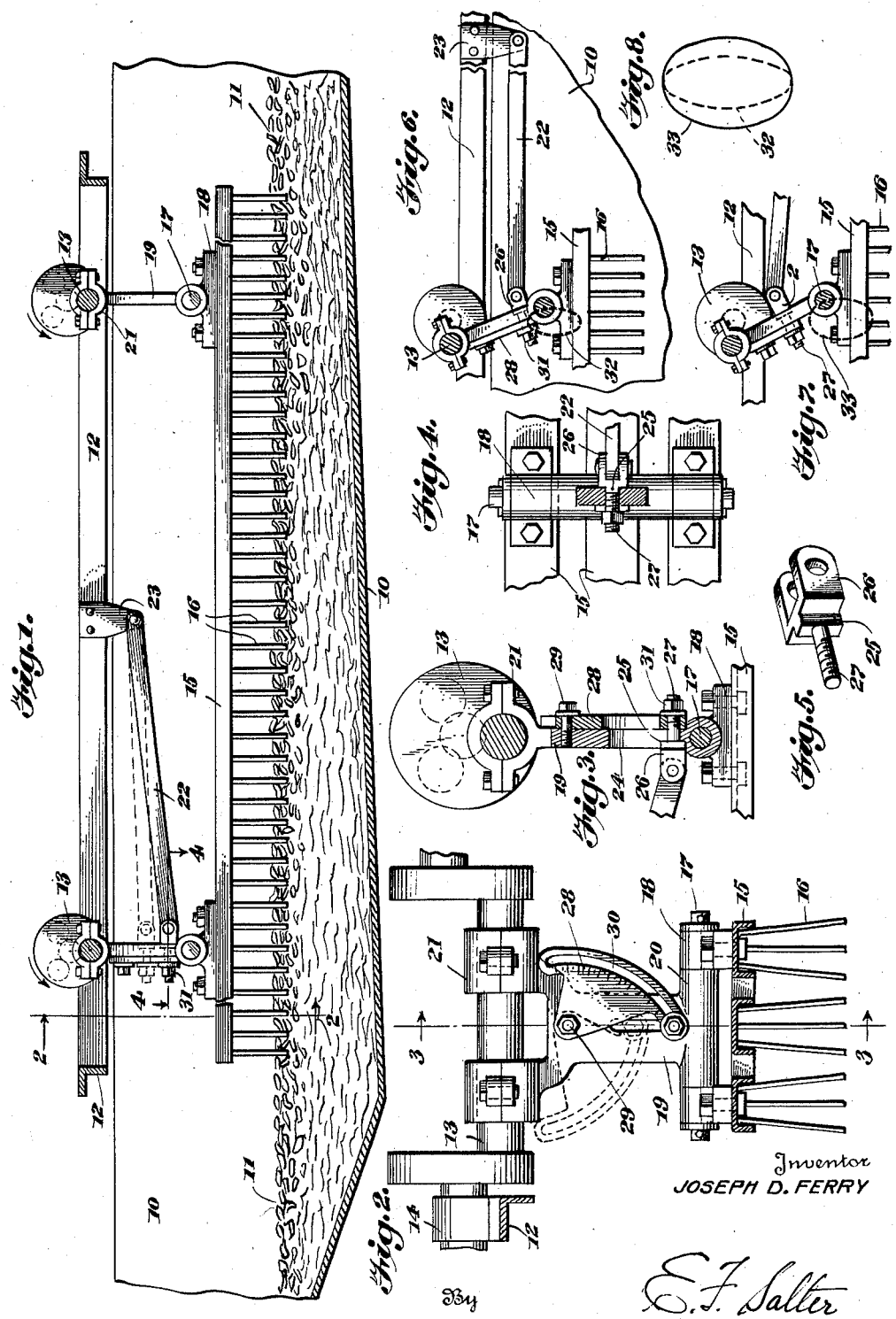
Inventor
JOSEPH D. FERRY
By E. F. Salter
Attorney Patented June 29, 1937

2,085,494

UNITED STATES PATENT OFFICE 2,085,494

IMPELLER MECHANISM FOR COOKING APPARATUS

Joseph D. Ferry, Harrisburg, Pa.

Application December 4, 1936, Serial No. 114,244

11 Claims. (Cl. 53—7)

The present invention relates to improvements in food preparing and cooking apparatus such as is used in the preparation of potato chips or the like, although not necessarily restricted to this use, and is directed more particularly to the impelling mechanism of such apparatus.

In apparatus of this character, it is customary to provide the cooking kettle with impellers which move the articles of food or the like through the kettle and subject them to intermittent advancements and immersions in the cooking liquid as they progress through the cooking kettle.

An important object of the present invention is the provision of mechanism to control and adjust the movement of such impellers.

Another object of the invention is the provision of adjusting mechanism of this character which may be readily controlled, which is of simple construction and operation and which is inexpensive to produce and install.

Other objects and advantages of the invention will be apparent during the course of the following description.

In the accompanying drawing, which forms a part of this specification and wherein like characters of reference denote like parts throughout, Figure 1 is a longitudinal sectional view through the cooking kettle illustrating the position of the impelling mechanism therein, Figure 2 is a fragmentary transverse sectional view on the line 2—2 of Figure 1, parts being shown in elevation, Figure 3 is a detail sectional view on the line 3—3 of Figure 2, Figure 4 is a detail sectional view on the line 4—4 of Figure 1, Figure 5 is a detail perspective view of the adjusting slide, Figure 6 is a fragmentary sectional view showing a portion of the impelling mechanism in one adjusted position, Figure 7 is a similar view illustrating another adjusted position of the impelling mechanism, and Figure 8 is a diagram illustrating variations in the path of movement of the impelling mechanism.

In the drawing wherein for the purpose of illustration is shown a preferred embodiment of the invention, the numeral 10 designates the cooking kettle, parts of which are broken away in Figure 1, and the cooking liquid 11 is disposed in this kettle. Potato chips move from right to left through the kettle in Figure 1 and heat is supplied from the right hand or inlet end of the kettle to produce higher temperatures at the inlet end than at the outlet end thereof. The kettle of this invention is the same as that of my prior Patent 2,056,845 and is adapted to be used in the apparatus covered by that patent.

An impeller frame 12 is supported immediately above the kettle and may be arranged to be swung away from the kettle in the manner disclosed in my prior patent referred to above. A pair of crank shafts 13 are journaled in suitable bearings 14 carried by the frame 12 and extend transversely of the frame adjacent each end thereof. The crank-shafts 13 may be rotated in any desired manner, as for example by suitable gearing. The impelling members comprise a plurality of longitudinally extending rake-like impellers 15 having depending tines 16 adapted to dip into the cooking liquid or solution 11 to engage and advance the potato chips therein. Suitable wrist pins 17 are supported by brackets 18 carried by the impellers 15, and connecting rods 19 have lower bearing sleeves 20 engaging the wrist pins 17 and upper split bearing sleeves 21 engaging the cranks of the crank shafts 13. It will be seen that if the movement of the impellers 15 is otherwise unrestricted, rotation of crank shafts 13 will move the impellers in a circular path.

The impellers may be of any suitable number arranged in parallel relation. Three impellers have been found to be adequate, and as seen in Figure 2, each impeller rake may be provided with a plurality of longitudinal rows of depending tines. The crank shafts 13 are rotated in a counter-clockwise direction in Figure 1, as indicated by the arrows so that when the tines dip into the cooking solution at the lower portion of their travel, the tines will move through the solution from right to left of Figure 1 and return above the level of the cooking liquid. At each revolution of the crank shafts, the tines will dip into the cooking solution, engaging and immersing chips floating on the surface of the solution, and advancing or moving said chips longitudinally towards the outlet end of the kettle. In my prior patent referred to above it has been proposed to impart an elliptical motion to the impellers with the minor axis of the ellipse disposed horizontally, that is, in a position parallel to the direction of travel of the chips through the machine. The purpose of this elliptical motion is to shorten the period of immersion of the chips, and at the same time decrease the distance the chips are advanced with each revolution of the crank-shafts.

It is now proposed to provide a ready control or adjustment of the path of the impellers, such adjustment being desired to cope with the varying factors involved, particularly the variation in the characteristics of the chips being treated, some of which require longer cooking than do others.

In order to obtain the desired elliptical movement of the impellers, a link 22 is pivotally secured to a bracket 23 carried by the central portion of supporting frame 12 and the link extends forwardly to engage the connecting rod 19 at the outlet end of the kettle. There will be one link for each of the impellers, although only one impeller and link are illustrated herein.

The body portion of the connecting rod 19 is in the form of a flat plate provided with a vertical slot 24 extending from lower bearing 20 to a point adjacent the center of the connecting rod. A slide block 25 fits within the slot 24 and has a pair of spaced ears 26 adapted to pivotally engage the link 22. A bolt or screw-threaded stud 27 extends from the opposite side of the slide block 25 and is adapted to project through slot 24. A cam plate 28 is pivotally secured at 29 to the upper portion of connecting rod 19 in line with slot 24 and is provided with an eccentrically curved cam slot 30 through which stud 27 is adapted to project. A nut and washer 31 secures the stud 27 to the cam plate 28.

It will be seen that when the slide block 25 is in its lower position at the bottom of slot 24 as seen in Figure 6, rotation of the crank shafts will impart an elliptical movement to the impeller in which the minor axis of the ellipse will be very short as compared to the major axis thereof, as indicated by the path 32 in Figures 6 and 8. When the slide block 25 is adjusted upwardly in slot 24 to the position indicated in dotted lines in Figure 1 and full lines in Figure 7 the ellipse will more nearly approach a circle, as indicated by path 33 in Figures 7 and 8. Any desired path between the ellipse 32 and a true circle may be obtained by adjustment of the slide block 25 in slot 24.

An important feature of this invention is the provision of the cam plate 28 to assist in the adjustment of block 25 and link 22. Without the cam plate, adjustment of the slide is very difficult because when nut 31 is loosened, the slide would tend to fall to the bottom of slot 24, thereby losing the former adjustment. With the present construction, adjustment can be made by movement of the cam plate 28 which greatly simplifies the adjustment. If desired the cam plate may be graduated adjacent the cam slot 30.

As the rotation of crank shafts 13 is relatively slow, adjustment of cam plate 28 may be made while the machine is in operation or between periods of operation.

The path of each impeller is adjustable independently of the other impellers, and the adjustment can be made simply and rapidly to obtain the desired movement of the impellers and the resulting cooking treatment of the chips.

While I have described the preferred embodiment of the invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. In an apparatus of the character described, a container for the reception of a cooking liquid, an impeller in said container above the level of the liquid therein, means to move said impeller in an elliptical path to cause said impeller to dip into the cooking liquid, the major axis of the elliptical path of the impeller being substantially vertically arranged, and means to vary the minor axis of the elliptical path of the impeller.

2. In an apparatus of the character described, a container for the reception of a cooking liquid, a supporting frame arranged in proximity to said container, an impeller arranged in said container and supported by said frame, means to move said impeller in an elliptical path to cause the impeller to dip into said cooking liquid, and means to vary the ratio of the minor axis to the major axis of the elliptical path.

3. In an apparatus of the character described, a container for the reception of a cooking liquid and adapted to have potato chips moved therethrough, an impeller in said container above the level of the liquid therein, said impeller having depending members, means to move said impeller in an elliptical path to cause said depending members to intermittently dip into the cooking liquid when traveling in one direction for engaging and advancing the chips and to return at a level above that of the cooking liquid when traveling in the opposite direction, the major axis of the elliptical path of the impeller being substantially vertically arranged whereby the advancement of the chips during each stroke of the impeller is determined by the minor axis of the elliptical path, and means to vary the length of the minor axis of the elliptical path.

4. In an apparatus of the character described, a container for the reception of a cooking liquid, a supporting frame arranged in proximity to the top of the container, a rotating eccentric carried by said frame, an impeller arranged in said container, a connecting rod pivotally secured to the eccentric and to the impeller, a link pivotally connecting the frame to the connecting rod whereby rotation of the eccentric will impart an elliptical movement to the impeller, and means to adjust the position of the link with respect to the connecting rod.

5. In an apparatus of the character described, a container for the reception of a cooking liquid, a supporting frame, a rotating eccentric carried by the frame, an impeller arranged in the container, a connecting rod pivotally connecting the eccentric and impeller, a link pivotally connecting the frame to the connecting rod whereby rotation of the eccentric will impart an elliptical movement to the impeller, and means to adjust the link vertically of the connecting rod to vary the minor axis of the elliptical path of the impeller.

6. In an apparatus of the character described, a container for the reception of a cooking liquid, a supporting frame, a rotating eccentric carried by the frame, an impeller arranged in the container, a connecting rod pivotally connecting the eccentric and impeller, said connecting rod having a substantially vertical slot, a link pivotally connected to the frame, and a slide adjustably arranged in the connecting rod slot and pivotally connected to the link.

7. In an apparatus of the character described, a container for the reception of a cooking liquid, a supporting frame, a rotating eccentric carried by the frame, an impeller arranged in the container, a connecting rod pivotally connecting the eccentric and impeller, said connecting rod having an elongated substantially vertical slot, a link pivotally connected to the frame, a slide adjustably arranged in the connecting rod slot and pivotally connected to the link, and a cam element carried by the connecting rod and engaging the slide, said cam element being adapted to be moved to adjust the slide vertically of the connecting rod slot.

8. In an apparatus of the character described, a container for the reception of a cooking liquid, a supporting frame, a rotating eccentric carried by the frame, an impeller arranged in the container, a connecting rod pivotally connecting the eccentric and impeller, said connecting rod having a substantially vertical slot, a link pivotally connected to the frame, a slide adjustably arranged in the connecting rod slot and pivotally connected to the link, a cam element carried by the connecting rod and engaging the slide, said cam element being adapted to be moved to adjust the slide vertically of the connecting rod slot, and means to lock the cam element and slide in adjusted position.

9. An apparatus of the character described comprising a container adapted to receive a cooking liquid, a supporting frame, a crank-shaft journaled in said frame, an impeller arranged in said container, a connecting rod pivotally connecting the crankshaft and impeller, a link pivotally connected to the frame and having a sliding connection with the connecting rod, and a movable cam element connecting the link and connecting rod, said cam element being adapted to be moved to adjust the link relative to the connecting rod.

10. An apparatus of the character described comprising a container adapted to receive a cooking liquid, a supporting frame, a crank-shaft journaled in said frame, an impeller arranged in said container, a connecting rod pivotally connecting the crank-shaft and impeller, a link pivotally connected to the frame and having a sliding connection with the connecting rod, a movable cam element connecting the link and connecting rod and adapted to be adjusted to slide the link relative to the connecting rod, and means to lock the cam element in adjusted position.

11. An apparatus of the character described comprising a container adapted to receive a cooking liquid and adapted to have potato chips moved therethrough, a supporting frame, a crank-shaft journaled in said frame, an impeller arranged in said container above the level of the liquid therein and having depending members, a connecting rod pivotally connecting the crankshaft and the impeller, a link pivotally secured to the frame and having a sliding connection with the connecting rod, whereby rotation of the crank-shaft moves the impeller in an elliptical path to cause said depending members to intermittently dip into the cooking liquid when traveling in one direction for engaging and advancing the chips and to return at a level above that of the cooking liquid when traveling in the other direction, the major axis of the elliptical path of the impeller being substantially vertically arranged whereby the advancement of the chips during each stroke of the impeller is determined by the length of the minor axis of the elliptical path, and a movable cam element connecting the connecting rod and link to slide the link with respect to the connecting rod and vary the length of the minor axis of the elliptical path of the impeller.

JOSEPH D. FERRY.